United States Patent
Segal et al.

(10) Patent No.: US 10,607,306 B2
(45) Date of Patent: Mar. 31, 2020

(54) SYSTEM AND METHOD FOR OPTIMIZING A COURSE CATALOG

(71) Applicant: Edunav, Inc., Cupertino, CA (US)

(72) Inventors: Tsakhi Segal, Cupertino, CA (US);
Justin Falk, Sunnyvale, CA (US);
Andrey Stepantsov, San Jose, CA (US)

(73) Assignee: Edunav, Inc., Cupertino, CA (US)

( * ) Notice: Subject to any disclaimer, the term of this patent is extended or adjusted under 35 U.S.C. 154(b) by 858 days.

(21) Appl. No.: 14/795,054

(22) Filed: Jul. 9, 2015

(65) Prior Publication Data

US 2016/0140679 A1     May 19, 2016

Related U.S. Application Data

(60) Provisional application No. 62/079,578, filed on Nov. 14, 2014, provisional application No. 62/102,608, filed on Jan. 13, 2015.

(51) Int. Cl.
    *G06Q 10/10*     (2012.01)
    *G06Q 50/20*     (2012.01)

(52) U.S. Cl.
    CPC ......... *G06Q 50/2053* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 2005/0075921 A1* | 4/2005 | Hayes-Roth | G06Q 10/06 705/7.26 |
| 2005/0106594 A1* | 5/2005 | Ellington | C12N 15/111 435/6.11 |
| 2006/0019222 A1* | 1/2006 | Lelito | G09B 7/02 434/118 |
| 2006/0105315 A1* | 5/2006 | Shaver | G06Q 10/02 434/362 |
| 2006/0252021 A1* | 11/2006 | Watkins | G09B 5/00 434/350 |
| 2008/0293030 A1* | 11/2008 | Hixon | G09B 7/00 434/322 |
| 2010/0223194 A1* | 9/2010 | Adams | G06Q 10/10 705/327 |
| 2012/0148999 A1* | 6/2012 | Baker | G09B 7/00 434/362 |
| 2012/0330869 A1* | 12/2012 | Durham | G06N 5/022 706/16 |
| 2014/0089219 A1 | 3/2014 | Mathews | |

(Continued)

*Primary Examiner* — Thomas L Mansfield
(74) *Attorney, Agent, or Firm* — M&B IP Analysts, LLC

(57) ABSTRACT

The method comprises: retrieving, from a database, a plurality of optimal study paths selected by a plurality of students, wherein each of the plurality of optimal study paths is a combination of courses and their order during a plurality of study terms; determining an estimated attendance for each of a plurality of courses designated in the plurality of optimal study paths; assigning class hours to each of the plurality of courses based on the estimated attendance; optimizing the assignment of class hours of the plurality of courses, wherein the optimization maximizes a number students registered to their respective study paths; and generating an optimal course catalog based on the optimized assignment of class hours.

20 Claims, 10 Drawing Sheets

(56) References Cited

U.S. PATENT DOCUMENTS

| | | | |
|---|---|---|---|
| 2014/0195450 A1* | 7/2014 | Van Pelt | G09B 7/00 |
| | | | 705/327 |
| 2014/0236854 A1* | 8/2014 | Strazzarino | G06Q 10/063 |
| | | | 705/326 |
| 2016/0140679 A1* | 5/2016 | Segal | G06Q 50/2053 |
| | | | 705/327 |

* cited by examiner

SYSTEM AND METHOD FOR OPTIMIZING A COURSE CATALOG

CROSS-REFERENCE TO RELATED APPLICATIONS

This application claims the benefit of U.S. Provisional Application No. 62/079,578 filed on Nov. 14, 2014 and U.S. Provisional Application No. 62/102,608 filed Jan. 13, 2015, the contents of which are hereby incorporated by reference.

TECHNICAL FIELD

The present disclosure relates generally to creating plans for obtaining educational degrees, and more particularly for creating course catalogs according to students' selected study paths.

BACKGROUND

As society moves towards increasingly specialized professions, there is also a rising need for new job candidates to achieve higher education requirements. Typically, this includes a bachelor's degree, or its equivalent, from an accredited higher education institution. In some countries, such as the United States of America, higher education can be an expensive choice which, coupled with financial uncertainty, may prove risky for a university candidate.

It is estimated that roughly nineteen billion ($19B) US Dollars are spent annually on excess credits, which students are not required to achieve in order to graduate. This excess spending often occurs due to complicated registration processes and prerequisite courses which may not be evident early on in a candidate's choice of a curriculum. While this is a clear disadvantage for students, it also presents a challenge to institutions. It is estimated that roughly half of candidates in the United States do not graduate within 6 years from entering college.

One particular issue for ensuring prompt graduations is that there is no way to efficiently determine the optimal study path for any particular student from the beginning of college. The number of potential combinations of courses that any given student may undergo during his or her course of study is astronomical. Even in smaller programs with limited numbers of courses offered, the number of potential combinations of courses over the course of a multiple year degree can easily be in the millions. As a result, students may begin taking courses without a clear study path in mind, thereby leading to undesirable results ranging from cramming in courses toward the end of their studies to ultimately missing important classes and delaying graduation. As a result, the completion time and costs are more than what the students initially planned for. For example, currently only about 50% of the students compete their degree within 6 years and about 30% of the community colleges' students graduate within 3 years.

Existing solutions for planning study paths are very limited and in most cases such solutions do not guide or prevent students from taking incorrect courses. An example for such solution is a degree auditing that provides a list of requirements for a student's major or minor such as, for example, required courses, minimum numbers of credits, research or other non-classroom requirements, and so on. At best the degree auditing solution would prevent enrollment of students in courses which the students have not met the prerequisites for. For example, a student may be prevented from enrolling in Calculus II if that student has not yet taken Calculus I.

The existing solutions do not, however, guide a student's study path based on broader goals such as a student's career or educational plans. Moreover, such solutions do not factor in scheduling per semester based around a student's employment or other particular requirements. As a result, such solutions are not capable of ensuring correct curriculum choices for student study paths based on student goals and other restrictions.

Furthermore, currently a career advisor or counselor at best may advise on profession options that may fit the student's interests. However, due to the number of course combinations and schools in which a student may obtain the qualifications to practice the profession, a career advisor cannot provide the student with an optimal study path that ensures the student's graduation based on the student's goals and educational requirements.

Additionally, existing solutions cannot accurately predict attendance levels for various courses. Such an inability to predict attendance frequently leads to problems such as failing to have enough teachers and/or sections open to allow maximum attendance and interfering with students' study paths by preventing students from taking courses that are key to the study paths at the desired times. Alternatively, this inability to predict attendance may lead to overbooking of courses, thereby needlessly wasting educational resources such as teachers and classrooms.

It would therefore be advantageous to provide a solution that would overcome the deficiencies of the prior art by generating an optimized course catalog.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for optimizing a course catalog. The method comprises: retrieving, from a database, a plurality of optimal study paths selected by a plurality of students, wherein each of the plurality of optimal study paths is a combination of courses and their order during a plurality of study terms; determining an estimated attendance for each of a plurality of courses designated in the plurality of optimal study paths; assigning class hours to each of the plurality of courses based on the estimated attendance; optimizing the assignment of class hours of the plurality of courses, wherein the optimization maximizes a number students registered to their respective study paths; and generating an optimal course catalog based on the optimized assignment of class hours.

Certain embodiments disclosed herein include a system for optimizing a course catalog. The system comprises: a database; a processing unit; and a memory, the memory containing instructions that, when executed by the processing unit, configure the system to: retrieve, from the database, a plurality of optimal study paths selected by a plurality of students, wherein each of the plurality of optimal study paths is a combination of courses and their order during a plurality of study terms; determine an estimated attendance for each of a plurality of courses designated in the plurality of optimal study paths; assign class hours to each of the plurality of courses based on the estimated attendance; optimize the assignment of class hours of the plurality of courses, wherein the optimization maximizes a number students registered to their respective study paths; and generate an optimal course catalog based on the optimized assignment of class hours.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
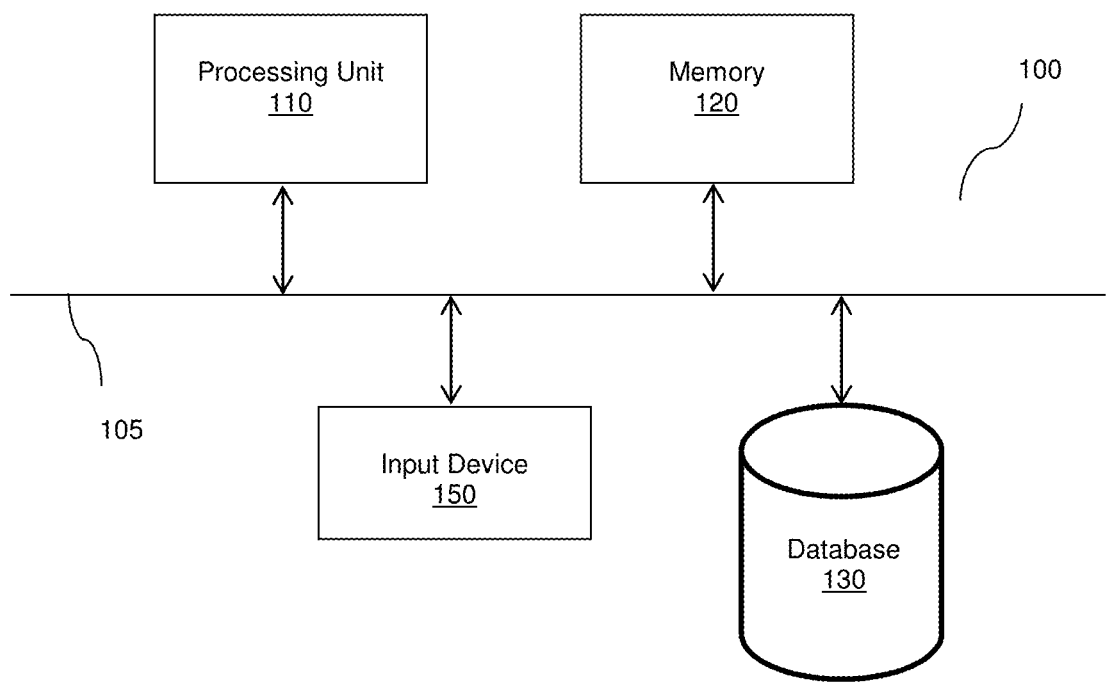
FIG. 1 is a schematic diagram of a system utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an exemplary and non-limiting schematic diagram of a system 100 utilized to describe the various disclosed embodiments. The system 100 includes at least one processing unit 110 such as, for example, a central processing unit (CPU). The processing unit 110 is coupled via a bus 105 to a memory 120. In an embodiment, the memory 120 further includes instructions that, when executed by the processing unit 110, configure the system to perform the methods described in more detail herein. The memory may be further used as a working scratch pad for the processing unit 110, a temporary storage, and so on. The memory 120 may be, but is not limited to, a volatile memory such as random access memory (RAM), or a non-volatile memory (NVM), such as Flash memory. The processing unit 110 may be communicatively connected to an input device 150 for permitting a user to modify a study path or course catalog. The processing unit 110 may be further communicatively connected to a database 130. The database 130 may contain information related to a plurality of courses, such as a catalog containing each course and each class section of each course. In an embodiment, the database 130 further includes credential information of students.

In an embodiment, the processing unit 110 may comprise, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing unit 110 and/or the memory 112 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

In some embodiments, the system 100 may be part of a cloud-computing infrastructure, an application server, a web server, and the like. In such embodiments, users (e.g., students) of the system 100 may access the system remotely via, for example, a web browser.

Figure 2:
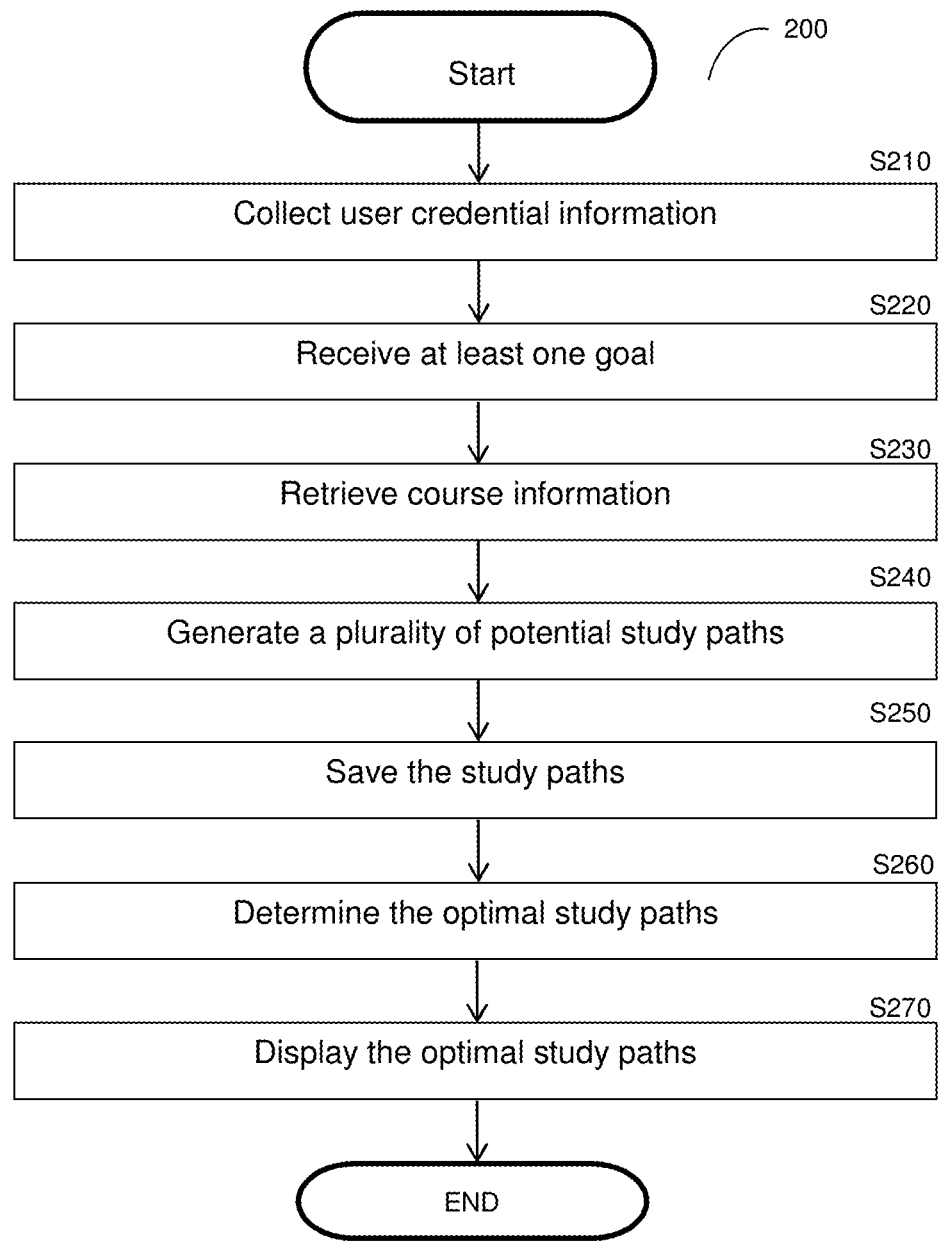
FIG. 2 is a flowchart illustrating determining potential study paths based on student goals according to an embodiment.

FIG. 2 is an exemplary and non-limiting flowchart illustrating determination of potential study paths towards degrees based on student goals in accordance with an embodiment. In S210, a student's credential information is collected. Credential information relates to a particular student and may include, but is not limited to, an identification number, a list of courses and/or credits the student has completed, any remedial course requirements of the student, a given name, a surname, and so on.

In S220, at least one goal of a student is received, wherein the at least one goal is related to the study path to be determined. A goal of the user may be, but is not limited to, a profession, a subject in which to major, a subject in which to minor, or an interest area, and so on. In an embodiment, a user may select the at least one goal from among several goals. In a further embodiment, information respective of each goal may be provided to the user during selection. The information respective of each goal typically contains information to help a student select a goal that he or she will be happy with. The information respective of each goal may be, but is not limited to, average income for a profession, employability of graduates with a selected major or minor, a list of professions within an interest area, and so on.

In some embodiments, a focus area may be further displayed respective of each goal. A focus area is an area of interest related to the user's goal and may be, but is not limited to, a concentration for a major, a specialty in a profession, and so on. Selecting goals and information respective thereof are described further herein below with respect to FIG. 3A.

In S230, information related to a plurality of courses is obtained from a database (e.g., the database 130). The information collected may be based on which courses will be required for the at least one goal given the student's credential information. For example, if a first student's major is Mechanical Engineering, the first student may be required to take courses such as Calculus I, Thermodynamics, and Mechanics. The plurality of courses may cover a plurality of study terms. The information may include hours during which each course is taught (e.g., Mondays from 6 P.M. to 8 P.M.), a midterm exam date of each course (e.g., October 11), a final exam date of each course (e.g., December 9), a start date for each course (e.g., August 28), an end date for each course (e.g., December 2), and so on.

In S240, a plurality of potential study paths is generated over the plurality of study terms respective of the plurality of courses. Each study path is a combination of courses and an order in which to take the courses during the plurality of study terms. An exemplary and non-limiting study path is described further herein below with respect to FIG. 3B. The study paths are determined to ensure that any prerequisite course is taken at least one term before the student enrolls in an advanced course that requires the prerequisite course. The study paths may also be determined to include any remedial classes. In an embodiment, S240 may further include performing degree auditing on each study path. In an embodiment, any study paths that fail the audit (i.e., do not make the student eligible to meet his or her goals) are not included in the generated plurality of study paths.

In S250, the plurality of study paths may be the saved in a database for future usage, e.g., to process a request from a different student with the same goals or to optimize catalogs. In some embodiments, S250 may further include displaying the plurality of study paths on a display as a time diagram over the plurality of study terms. An exemplary and non-limiting time diagram is described further herein below with respect to FIG. 3B.

In S260, at least one optimal study path from the plurality of potential study paths is determined. The optimal study path is determined based on goals, constraints, and preferences set by the user. The process for determining the optimal study path is discussed herein below with respect to in FIG. 4.

In S270, information of the at least one optimal study path is displayed to the user. The displayed information may include the courses for each term, information about each course, prerequisites for one or more courses, the expected completion time, the expected budget, and so on. In an embodiment, if the user is satisfied with the determined optional study path, a registration process may be initiated.

Figure 3A:
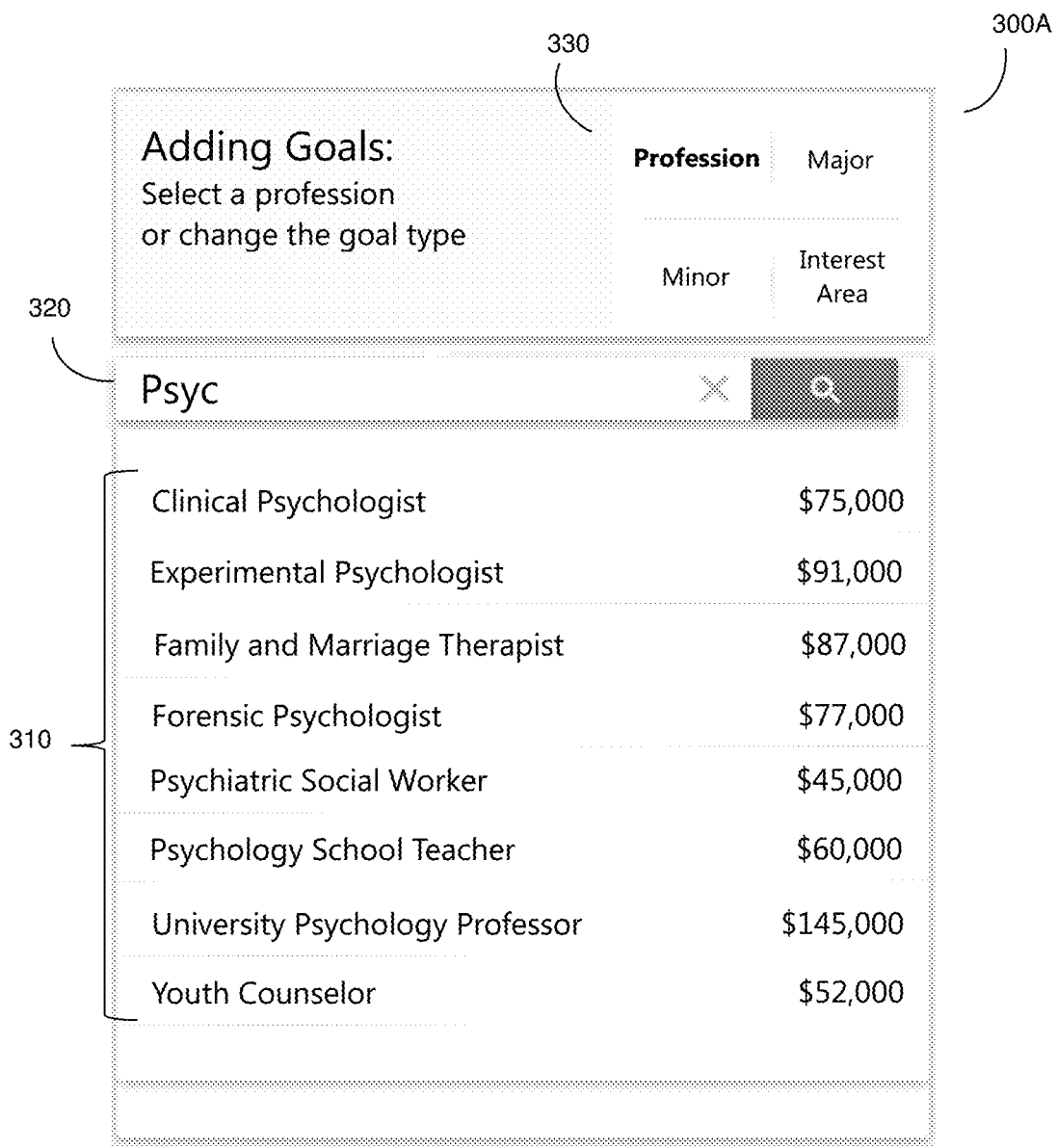
FIGS. 3A-3C are screenshots illustrating interactive study path planning according to an embodiment.

FIG. 3A is an exemplary and non-limiting screenshot 300A illustrating a drop down box featuring a plurality of potential goals 310 according to an embodiment. A search bar 320 allows a user to input a goal. In an embodiment, potential search results may be automatically populated as potential goals 310 in real-time. In another embodiment, the search results may be based on the type of goal 330. In the example shown in FIG. 3A, the type of goal selected is "Profession," and the user has entered "Psyc" into the search bar 320, thereby triggering a list of potential goals 310 that are professions related to "Psyc."

Figure 3B:
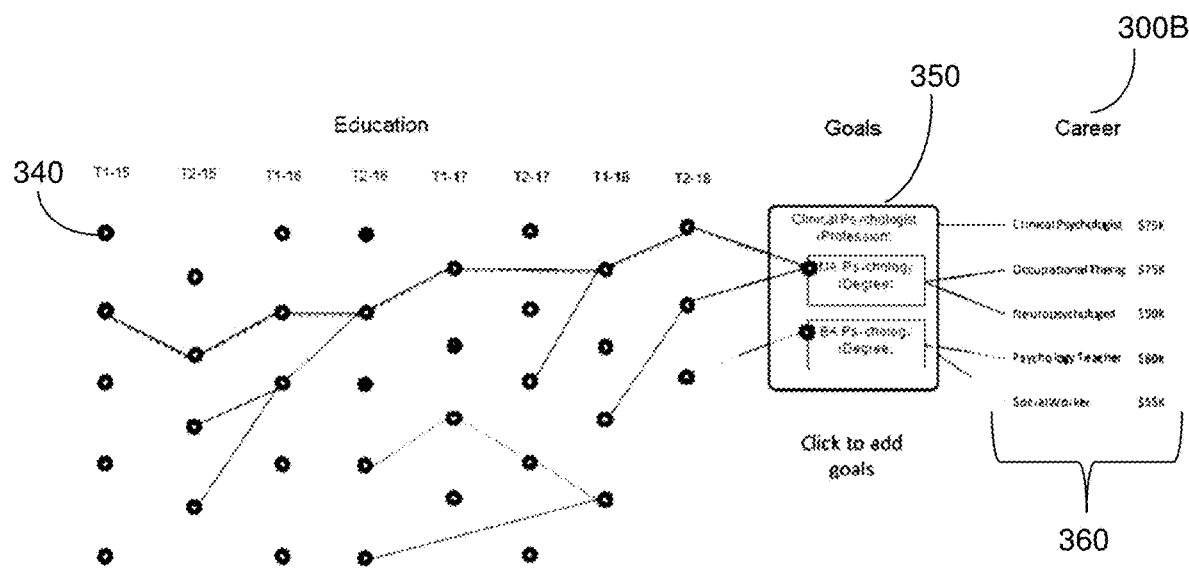

FIG. 3B is an exemplary and non-limiting screenshot 300B of a user interface for displaying a study path in accordance with an embodiment. In the example shown in FIG. 3B, the profession of "Clinical Psychologist" was selected as the ultimate career goal, and two study paths were determined for arriving at that career goal—a Master of Arts in Psychology for one educational goal, and a Bachelor of Arts in Psychology for the other educational goal. The educational goals are seen in the "Goals" box 350. Each study path includes a plurality of courses 340. In an embodiment, connections between courses (such as prerequisite courses) may be shown. The paths begin at the first trimester of 2015, labeled T1-15. The illustration further shows possible career opportunities 360 and how each path leads to a certain career opportunity.

Figure 3C:
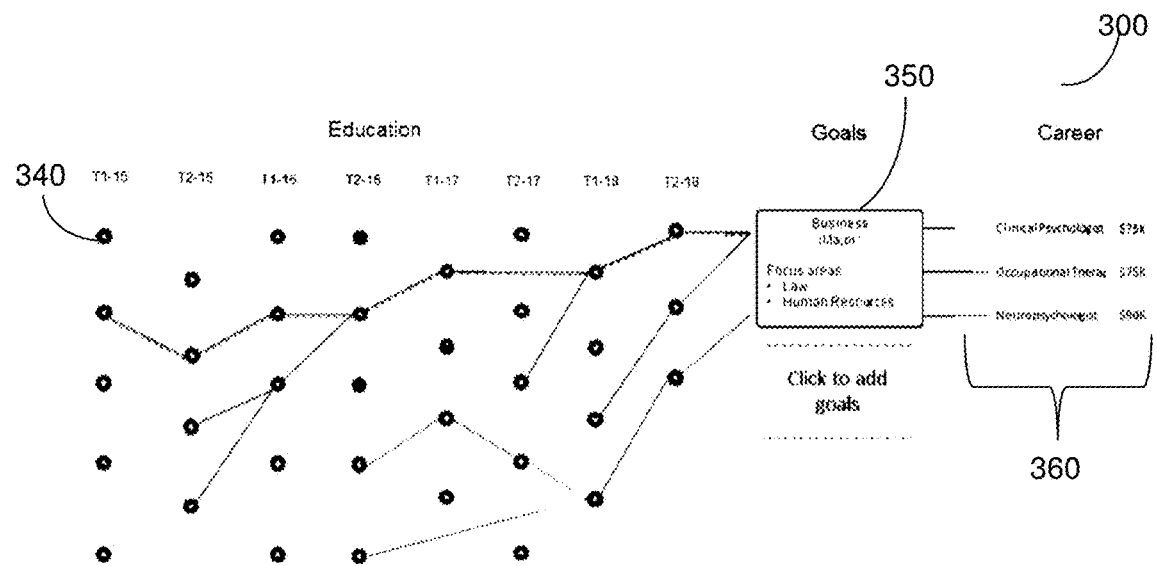

FIG. 3C is an exemplary and non-limiting screenshot 300C of a user interface for displaying a study path in accordance with an embodiment. In this example, a goal of "Business" major was selected (as seen in "Goals" box 350), with two possible focus areas—law and human resources. Based on this goal, a plurality of courses 340 needed to achieve the goal are displayed. Additionally, potential careers 360 utilizing the "Business" major and the possible focus areas are displayed.

Figure 4:
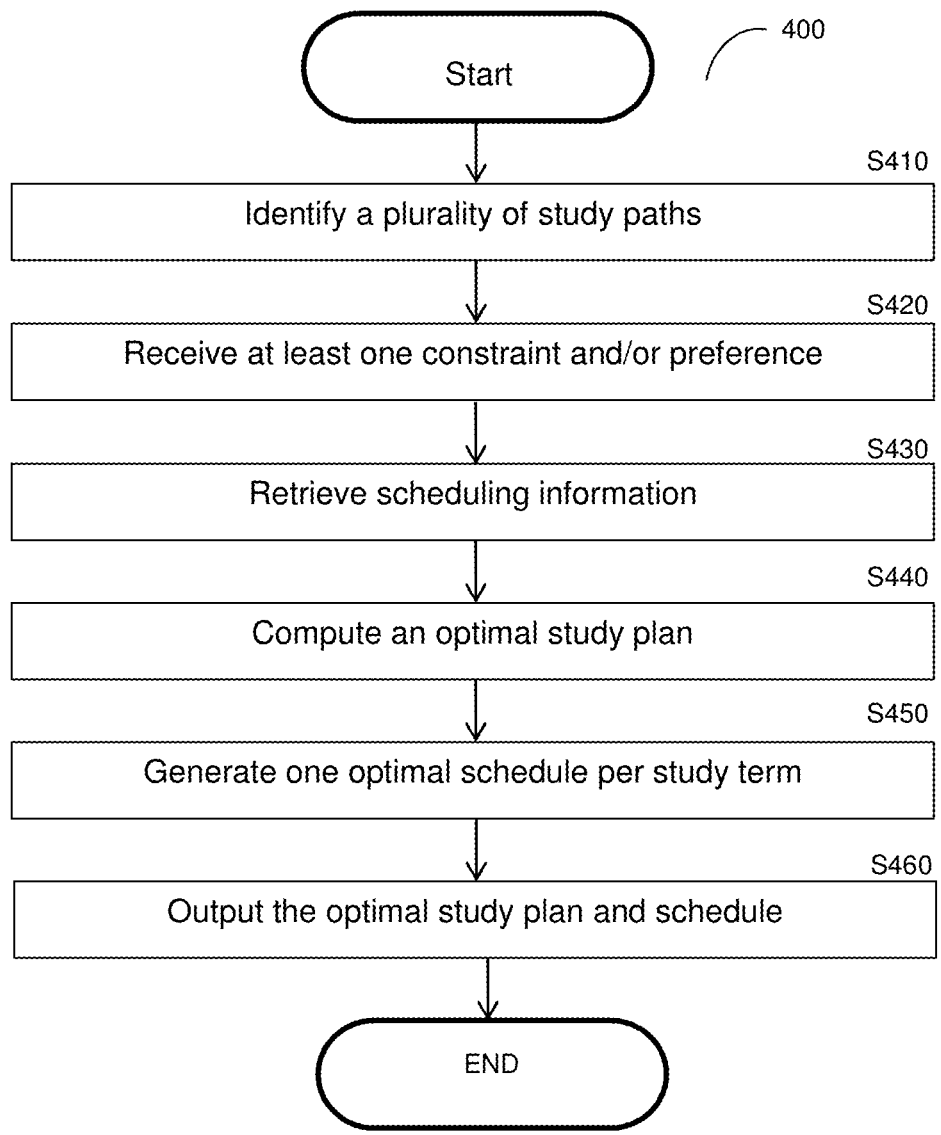
FIG. 4 is flowchart illustrating optimizing a study path based on student constraints and preferences according to an embodiment.

FIG. 4 is an exemplary and non-limiting flowchart S260 illustrating optimizing a study plan by determining at least one optimal schedule according to an embodiment. In S410, the plurality of study paths is received. In an embodiment, S410 may further include performing degree auditing to ensure that the determined plurality of study paths will result in achieving the student's goals. In an embodiment, the received plurality of study paths may be generated as described further herein above with respect to FIG. 2.

In S420, at least one of a student's constraints and/or preferences is received. A constraint is a restriction on the study path that may be, but is not limited to, a total time to complete education (e.g., 4 years), an educational budget (e.g., $150,000), and so on. Each constraint may be assigned a priority. If two constraints conflict, then the constraint with the higher assigned priority would be utilized first. For example, a student may want to prioritize completing his degree in 4 years (i.e. a typical college course load) rather than take summer courses at a lower cost and completing his degree in 3 years.

A preference is a particular inclination of the user that may be used to guide selection of courses when multiple courses can be utilized to achieve the student's goals. A preference may be, but is not limited to, favoring or disfavoring particular days of the week (e.g., favoring classes on Monday through Thursday but disfavoring classes on Friday), particular times (e.g., not beginning class before 10 A.M.), whether the course is offered online, favored instructors, areas of interest (e.g., sports, art, reading, writing, etc.), and so on. In an embodiment, each preference may be assigned a priority. If two preferences conflict, the higher priority preference would be utilized first. In a further embodiment, all preferences have a lower priority than all constraints such that, if a constraint and a preference conflict, the constraint will be utilized first.

In S430, scheduling information related to a plurality of courses included in the study plan and offered during a plurality of study terms are retrieved. The scheduling information may include days of the week in which a course is presented, location of a class of the course, hours during which each course is taught (e.g., Mondays from 6 P.M. to 8 P.M.), a midterm exam date of each course (e.g., October 11), a final exam date of each course (e.g., December 9), a start date for each course (e.g., August 28), an end date for each course (e.g., December 2), and so on. In an embodiment, the scheduling information may be retrieved from a database (e.g., the database 130). The study terms are the semesters in which the student plans to attend the school (e.g., all semesters between Fall of 2015 and May of 2019).

In S440, at least one optimal study path is computed respective of the plurality of study paths, the at least one constraint and/or preference, and the course information. In some embodiments, S440 includes eliminating from the received study paths all paths that do not meet the constraints in order of the constraints' respective priorities. For example, if the first priority constraint is a completion time and the second priority constrain is the budget, then first all the paths having a completion time higher than the input completion time are eliminated. Then, from the remaining study paths, all paths that cost more to complete than the input budget are removed. The remaining set of study paths are sorted or further eliminated based on the input preferences. For example, if one of the preference includes disfavoring classes on Friday, then all paths that include classes on Friday are filtered out. In an embodiment, the remaining potential study paths are sorted based on their best match to the at least one preference. The best match study path is the optimal study path.

In S450, at least schedule of courses is generated for each study term based on each of the at least one optimal study path.

In S460, the schedule of courses and/or the determined optimal study path are returned and/or displayed to a user. In one embodiment, the optimal study path is automatically modified whenever circumstances change. For example, circumstances may have changed when a new schedule is published and/or a selected course will not be delivered in the coming term. Alternatively or collectively, the determined optimal study path may be interactively modified by the user as discussed in more detail with respect to FIG. 8.

Figure 5:
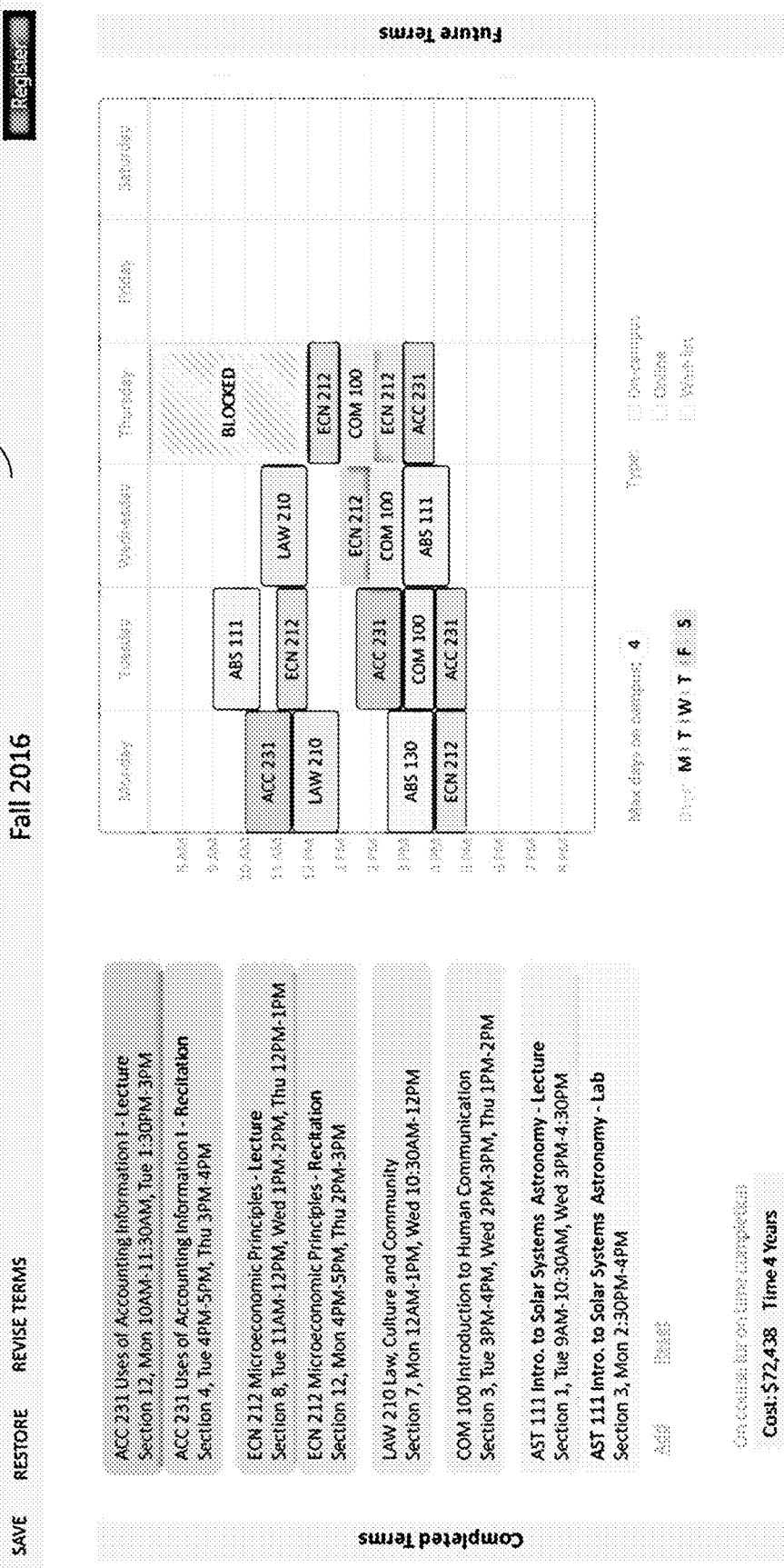
FIG. 5 is a screenshot illustrating study path optimization according to an embodiment.

FIG. 5 is an exemplary and non-limiting screenshot 500 illustrating a user interface displaying an optimal schedule, according to the constraints of having no more than 4 days of classes and of having Friday and Saturday free of classes.

Figure 6:
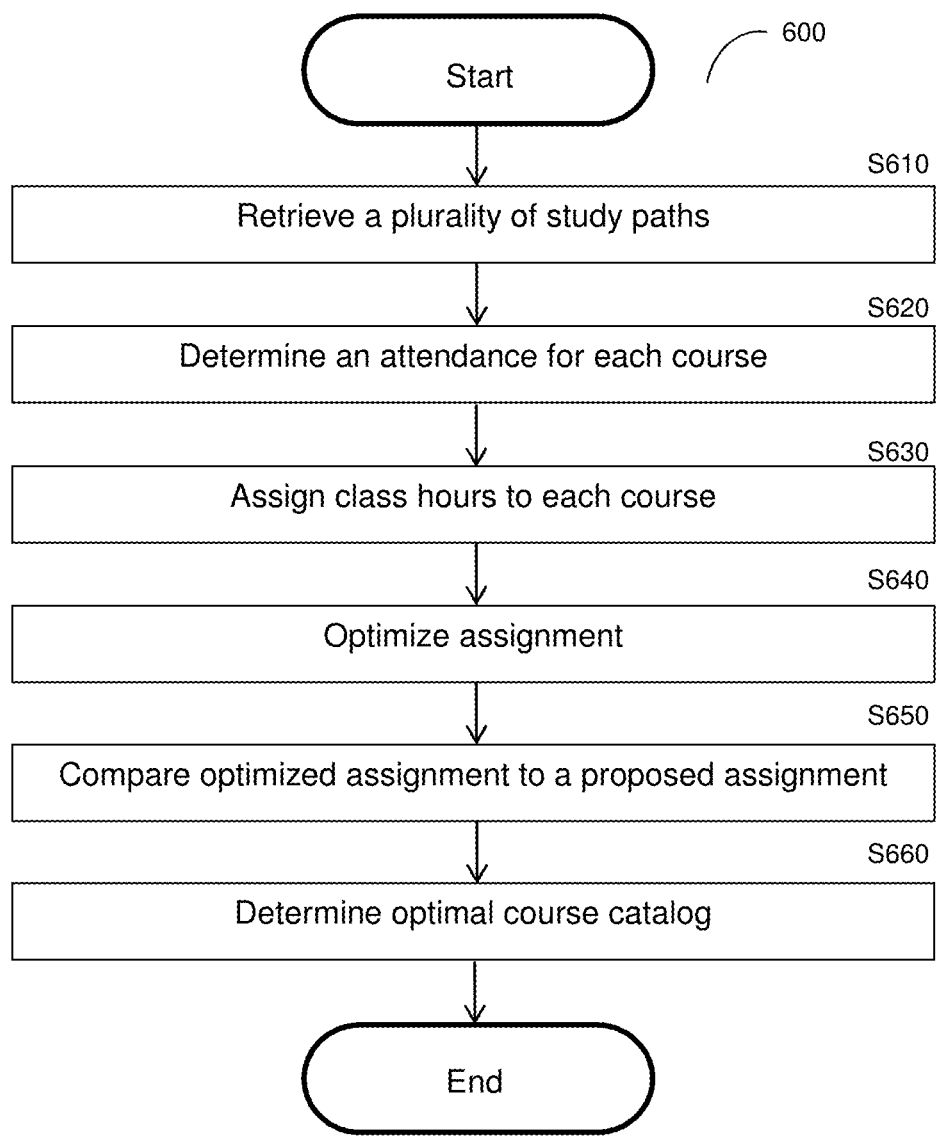
FIG. 6 is a flowchart illustrating optimizing a course catalog based on optimized study paths according to an embodiment.

FIG. 6 is an exemplary and non-limiting flowchart 600 illustrating generation of an optimized course catalog for an institution according to an embodiment. In S610, a plurality of study paths respective of all expected students is retrieved. In an embodiment, the plurality of study paths may be retrieved from a database (e.g., the database 130). Each study path may be determined as described further herein above with respect to FIGS. 2 and 4.

In S620, an estimated attendance for each term in which the course is offered is determined. The attendance may be estimated based on factors such as, but not limited to, expected numbers of students in the institution during various study terms, a number of students whose optimal study paths suggest taking the course during the particular term, and so on.

In S630, the schedules for all classes provided by the academic institution are received. In an embodiment, the schedules are provided by the different departments of the academic institution. This allows for further optimization of the catalog across different departments. A schedule of a class includes at least the class hours assigned to each course. Class hours may be, for example, every other Monday from 4 P.M. to 6 P.M. and Thursdays from 11 A.M. to 1 P.M. In an embodiment, S630 may further include determining a number of classes for each course based on at least a parameter (for example, two sections of the same class). The parameter may be determined based on the estimated attendance for the course during the term.

In S640, the assignment of class hours is optimized to maximize the number of students who are able to complete their respective study paths. In an embodiment, optimization may be performed by minimizing the number of empty seats in each class. Minimizing the number of empty seats may be performed based on, e.g., an estimated number of students attending the class, study paths of students, and comparing the estimated number to a number of planned seats for the class. A notification may be generated to add or remove seats for the class respective of the performed comparison. In an embodiment, optimization is performed by minimizing the overlap between class hours of courses which are taken in the same term according to a study path.

In S650, the optimized assignment is compared to a proposed assignment. The proposed assignment may be created by a group of faculty members based on, e.g., faculty availability, classroom availability, and so on.

In S660, an optimal course catalog is determined based on the optimized assignment and the proposed assignment. The catalog containing each course and each class of each course respective of the optimized assignment of class hours may be displayed. In some embodiments, a second course catalog is received. The second course catalog may be, for example, a catalog previously used by the institution. A system such as system 100 is configured to determine a discrepancy between the generated optimal course catalog and the received second course catalog. For example, the catalogs may be stored as structured databases. In such embodiments, it is possible to compare the values of corresponding data elements. Upon detecting a discrepancy between the catalogs, the system may generate a notification to a user of the system.

Figure 7:
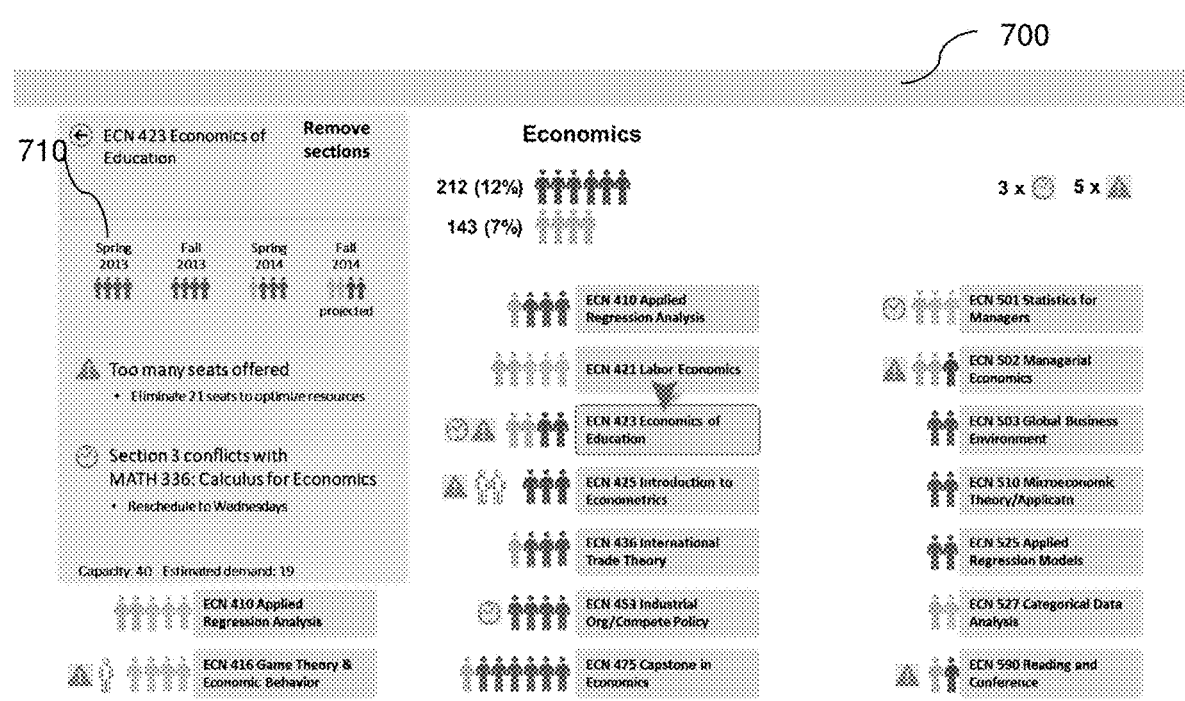
FIG. 7 is a screenshot illustrating a an optimized course catalog generated based on optimized study paths according to an embodiment.

FIG. 7 is an exemplary and non-limiting screenshot 700 of a user interface displaying a course catalog in accordance with an embodiment. In screenshot 700, an alert 710 is presented on the user interface to indicate issues regarding some courses in "Economics". For example, "ECN 423," a course named "Economics of Education", currently offers more seats than students anticipated to attend. It would therefore be a better use of resources to offer fewer seats in the course "ECN 423."

Figure 8:
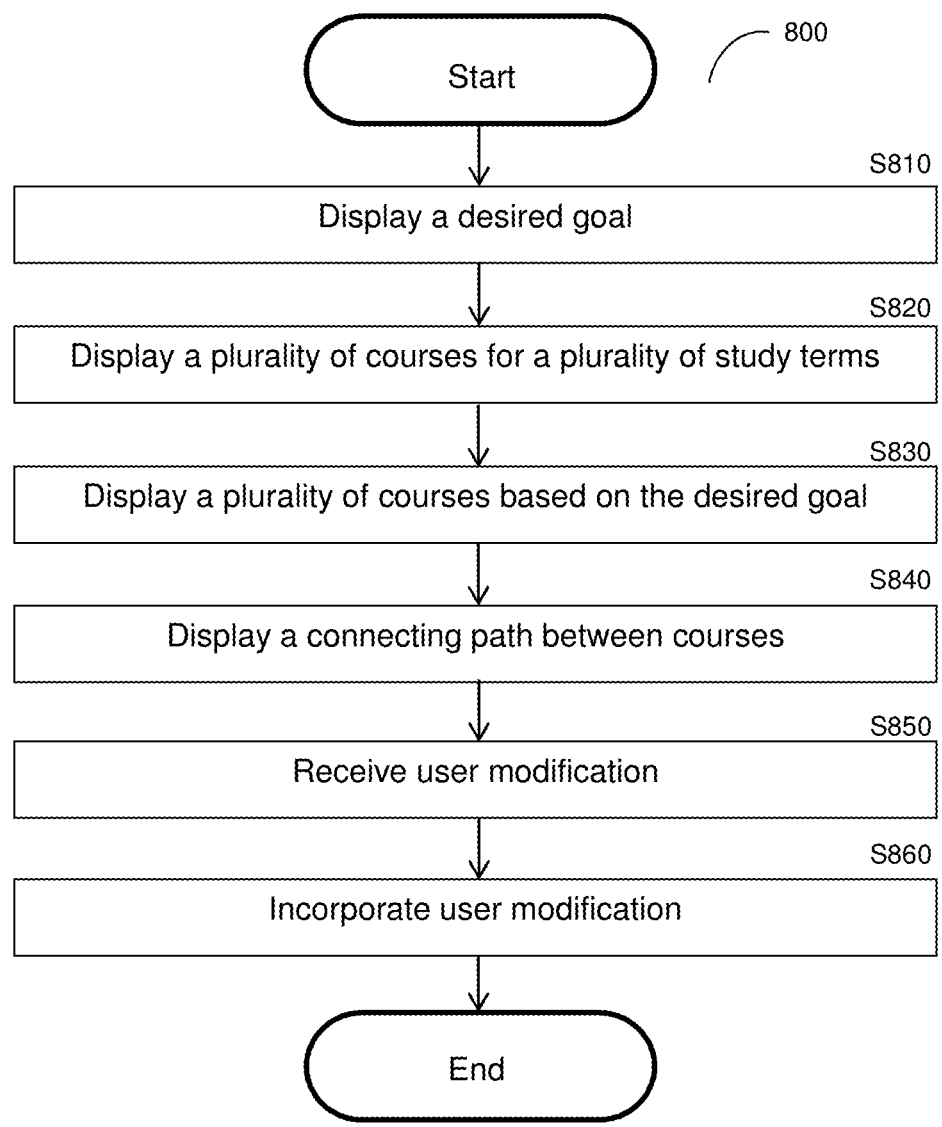
FIG. 8 is a flowchart illustrating generating a connected study path according to an embodiment.

FIG. 8 is an exemplary and non-limiting flowchart 800 illustrating providing an interactive display for planning a study path towards a degree according to an embodiment. In S810, at least one desired goal is displayed. A goal of the user may be, for example, a profession, a subject in which to major, a subject in which to minor, or an interest area. In an embodiment, information respective of the at least one goal may also be displayed. The information respective of the at least one goal may be, but is not limited to, average wage for a profession, employability of graduates with a selected major or minor, a list of professions within an interest area, and so on.

In S820, a plurality of courses for a plurality of study terms respective of the at least one desired goal is displayed. In S830, a plurality of courses respective of the at least a desired goal and the plurality of study terms is displayed. In S840, a connecting path between the plurality of courses that connects to at least one of the at least the desired goal is displayed. In S850, a user modification is received. The user modification may be, but is not limited to, adding a class, dropping a class, and so on. In S860, The user modification is incorporated. In an embodiment, the incorporation may further include adjusting the optimal study path of the student so as to incorporate the change while maintaining the user's goals. In an embodiment, the modification can be in response to changes made to at least one of the course's schedules. The changes to the schedules are automatically incorporated in to the study path.

It should be appreciated that the ability to interactively change the determined study paths allow the user to trade-off between various goals prior to and post registration. As a non-limiting example, the interactive modification allows a user to easily assess implications of switching a degree (lost credit hours and delay in graduation).

Figure 9:
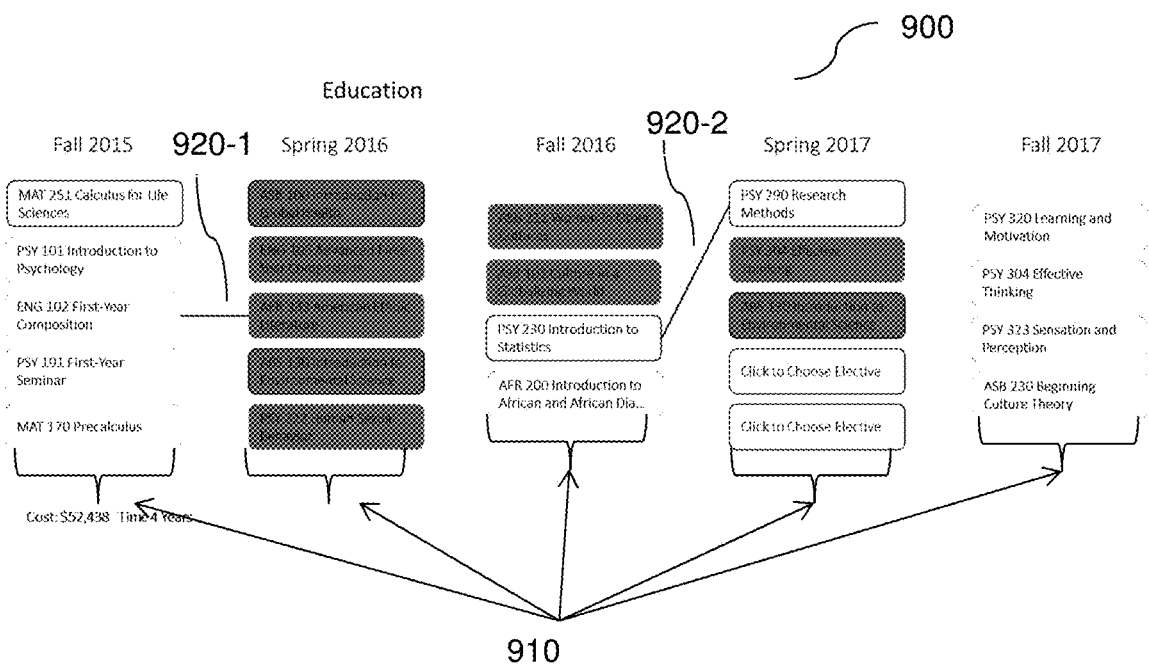
FIG. 9 is a screenshot illustrating a connected study path according to an embodiment.

FIG. 9 is an exemplary and non-limiting screenshot 900 of a user interface for providing an interactive display for planning a study path according to an embodiment. In this exemplary screenshot 900, the student's courses between Fall of 2015 and Fall of 2017 are displayed. Courses 910 making up course schedules are displayed for each semester. Links 920-1 and 920-2 between courses serve to visually indicate a prerequisite course and the advanced course which requires the prerequisite course be completed. In some embodiments, an advanced course may be linked to a plurality of prerequisite courses.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for optimizing a course catalog, comprising:
retrieving, by a computer, from a database communicatively connected to the computer, a plurality of optimal study paths selected by a plurality of students, wherein each of the plurality of optimal study paths is a combination of courses and their order during a plurality of study terms;
determining, by the computer, an estimated attendance for each of a plurality of courses designated in the plurality of optimal study paths;
assigning, by the computer, class hours to each of the plurality of courses based on the estimated attendance, wherein the assigning class hours further includes determining a number of classes for each course;
optimizing, by the computer, the assignment of class hours of the plurality of courses, wherein the optimization automatically (i) maximizes a number of students registered to their respective study paths, (ii) minimizes an overlap between class hours of courses which are taken simultaneously according to at least one of the plurality of study paths, and (iii) minimizes the number of empty seats in each class; and
generating, by the computer, an optimal course catalog based on the optimized assignment of class hours.

2. The method of claim 1, wherein optimizing the assignment of class hours further comprises:
minimizing a number of empty seats in each of the plurality of courses.

3. The method of claim 1, further comprising:
comparing the optimized assignment of class hours to a proposed assignment; and
adjusting the optimized assignment of class hours based on the comparison.

4. The method of claim 1, wherein assigning the class hours further comprises:
creating at least one class for each course.

5. The method of claim 1, further comprising:
generating the plurality of optimal study paths.

6. The method of claim 5, wherein generating each of the plurality of optimal study paths further comprises:
receiving at least one goal and at least one constraint;
generating a plurality of potential study paths based on courses that are required for the at least one goal and the at least one constraint; and
determining the each optimal study path based on the plurality of potential study paths, the at least one goal, and the at least one constraint, wherein the optimal study path satisfies the at least one constraint.

7. The method of claim 6, further comprising:
generating at least one optimal schedule based on the each optimal study path.

8. The method of claim 7, further comprising:
retrieving credential information, wherein the plurality of potential study paths is further generated based on the credential information.

9. The method of claim 6, wherein the at least one constraint is any of:
a total time to complete the at least one goal, and an educational budget.

10. The method of claim 1, further comprising:
receiving another course catalog;
determining a discrepancy between the generated optimal course catalog and the received another course catalog; and
generating a notification respective of the discrepancy.

11. A system for optimizing a course catalog, comprising:
a database;
a processing unit; and
a memory, the memory containing instructions that, when executed by the processing unit, configure the system to:
retrieve, from the database, a plurality of optimal study paths selected by a plurality of students, wherein each of the plurality of optimal study paths is a combination of courses and their order during a plurality of study terms;

determine an estimated attendance for each of a plurality of courses designated in the plurality of optimal study paths;

assign class hours to each of the plurality of courses based on the estimated attendance, wherein the assigning class hours further includes determining a number of classes for each course;

optimize the assignment of class hours of the plurality of courses, wherein the optimization (i) maximizes a number of students registered to their respective study paths, (ii) minimizes an overlap between class hours of courses which are taken simultaneously according to at least one of the plurality of study paths, and (iii) minimizes the number of empty seats in each class; and generate an optimal course catalog based on the optimized assignment of class hours.

12. The system of claim 11, wherein the system is further configured to:

minimize a number of empty seats in each of the plurality of courses.

13. The system of claim 11, wherein the system is further configured to:

compare the optimized assignment of class hours to a proposed assignment; and adjust the optimized assignment of class hours based on the comparison.

14. The system of claim 11, wherein the system is further configured to:

create at least one class for each course.

15. The system of claim 11, wherein the system is further configured to:

generate the plurality of optimal study paths.

16. The system of claim 15, wherein the system is further configured to:

receive at least one goal and at least one constraint;

generate a plurality of potential study paths based on courses that are required for the at least one goal and the at least one constraint; and determine the each optimal study path based on the plurality of potential study paths, the at least one goal, and the at least one constraint, wherein the optimal study path satisfies the at least one constraint.

17. The system of claim 16, wherein the system is further configured to:

generate at least one optimal schedule based on the each optimal study path.

18. The system of claim 17, wherein the system is further configured to:

retrieve credential information, wherein the plurality of potential study paths is further generated based on the credential information.

19. The system of claim 16, wherein the at least one constraint is any of:

a total time to complete the at least one goal, and an educational budget.

20. A non-transitory computer readable medium having stored thereon instructions for causing one or more processing units to execute a process, the process comprising:

retrieving, from a database, a plurality of optimal study paths selected by a plurality of students, wherein each of the plurality of optimal study paths is a combination of courses and their order during a plurality of study terms;

determining an estimated attendance for each of a plurality of courses designated in the plurality of optimal study paths;

assigning class hours to each of the plurality of courses based on the estimated attendance, wherein the assigning class hours further includes determining a number of classes for each course;

optimizing the assignment of class hours of the plurality of courses, wherein the optimization (i) maximizes a number of students registered to their respective study paths, (ii) minimizes an overlap between class hours of courses which are taken simultaneously according to at least one of the plurality of study paths, and (iii) minimizes the number of empty seats in each class; and generating an optimal course catalog based on the optimized assignment of class hours.

* * * * *